(No Model.)

A. FISK.
CAR COUPLING.

No. 468,600. Patented Feb. 9, 1892.

Witnesses:
J. B. McGirr.
D. N. Naylor

Amos Fisk,
Inventor.
by Wm. N. Moore,
Attorney.

UNITED STATES PATENT OFFICE.

AMOS FISK, OF AMBOY, MINNESOTA.

CAR-COUPLING.

SPECIFICATION forming part of Letters Patent No. 468,600, dated February 9, 1892.

Application filed September 9, 1891. Serial No. 405,174. (No model.)

*To all whom it may concern:*

Be it known that I, AMOS FISK, a citizen of the United States, residing at Amboy, in the county of Blue Earth and State of Minnesota, have invented certain new and useful Improvements in Car-Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in car-couplings; and one of the objects of my invention is the provision of a coupling which shall be automatic in its coupling action, and thereby prevent accidents to attendants when coupling the cars.

A further object of my invention is the provision of a coupling which will be certain in its action, and thereby never fail to couple—a defect in automatic couplings used generally.

A further object of my invention is the provision of a coupling which shall, in addition to the features named, be of simple, strong, and durable construction and which can be easily applied to cars and at a small expense.

To attain the desired objects the invention consists of a car-coupling constructed substantially as herein illustrated, described, and specifically claimed.

Figure 1:
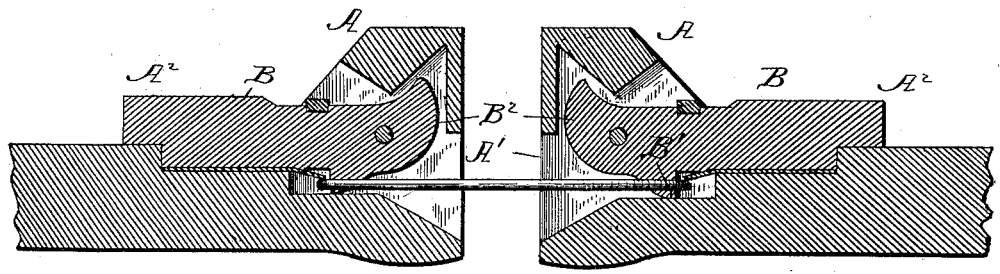
Figure 2:
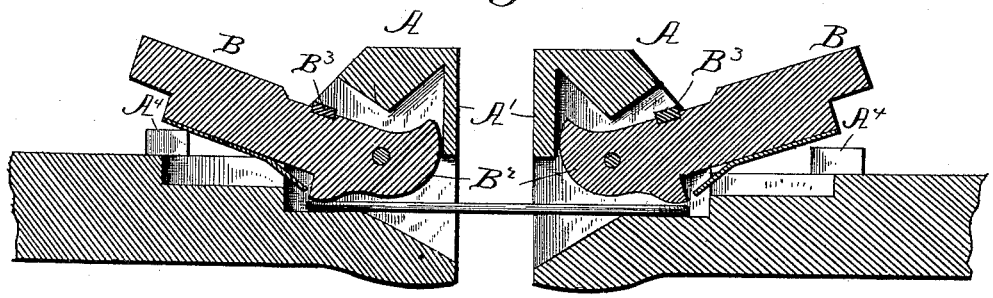
Figure 3:
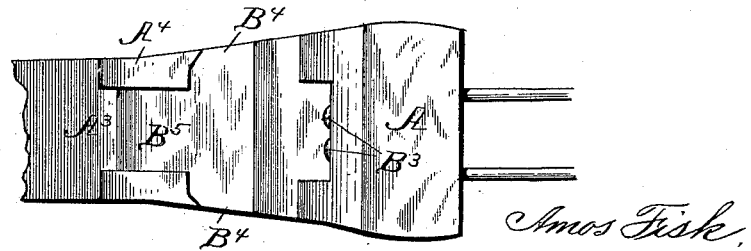

Figure 1 represents a longitudinal section of my coupling shown in coupled position. Fig. 2 represents a similar view shown in uncoupled position. Fig. 3 represents a plan view of one of the draw-heads.

Referring by letter to the drawings, A designates the draw-head, having the flaring mouth A' and the upward extension $A^2$, formed with the pocket or recess $A^3$, and in rear of the said extension, on the upper side, is provided with the ears or guides $A^4$.

B designates the dog or latch, which is provided with the hook B' to secure the link, the curved front end $B^2$ to receive the end of the link, or, rather, to be struck by the link, and said upper curved portion is adapted to normally lie in the recess $A^3$ of the draw-head. By this construction the dog cannot be struck on the upper side by the link, and thus the coupling of the draw-heads is made certain. The dog is pivoted in the draw-head, as shown, and on the upper side is provided with buffers $B^3$ to strike against the inclined upper wall of the draw-head and prevent shock to the parts, and said dog is further formed with the wings $B^4$, adapted to fit between the lugs and the shoulders at the rear of the upward extension of the draw-head, and with the reduced inner end $B^5$ normally resting between the ears or guides $A^4$. The inner end of the dog, it will be seen, is heavier than the front end, and said dog is pivoted in the draw-head in such manner that it will fall by gravity after the link has passed under it, and thus confine the link, and the under side of the dog normally rests in a channel of the draw-head and carries a metal strip C, extending to near the hook on the dog, as shown.

The operation of the coupling will be readily understood from the foregoing description, taken in connection with the drawings. The link of the approaching draw-head strikes against the front curved face of the dog, passes under said dog when the dog falls, and confines the link in rear of the hook thereof, as will be readily understood. To uncouple the cars it is merely necessary to lift the inner heavy end of the dog, which leaves the link free to be drawn out from the draw-head. It will be noticed that normally the upper front end of the dog is housed in the draw-head and it is impossible for the link to get above said upper end, and the coupling action is thus made sure. It will also be noticed that when the dog is struck by the link the buffers or cushions on the dog prevent the parts from being damaged.

It will thus be seen that I provide a coupling which is automatic and which will never fail to couple, which is of simple and durable construction, and which can be applied to cars at a small expense, thus possessing all the required features of merit.

I claim as my invention—

1. In a car-coupling, the combination of the draw-head, the dog pivoted therein and having the hook and extensions on the rear thereof, and the cushions or buffers on said dog, adapted to strike against the draw-head.

2. In a car-coupling, the combination of the draw-head having the recess in the front portion thereof and the guides at the rear, the dog pivoted in said draw-head and provided with the hook and extensions, and the cushions or buffers carried by the dog, the whole operating substantially as set forth.

In testimony whereof I affix my signature in presence of two witnesses.

AMOS FISK.

Witnesses:
J. F. SMITH,
H. KRUGER.